(12) United States Patent
Alvarez Ruiz et al.

(10) Patent No.: US 9,834,072 B1
(45) Date of Patent: Dec. 5, 2017

(54) LIFTGATE ASSEMBLY FOR A VEHICLE

(71) Applicant: Ford Global Technologies, LLC, Dearborn, MI (US)

(72) Inventors: Raul Ezequiel Alvarez Ruiz, Cuajimalpa de Morelos (MX); Liliana Alonso Vazquez, Delegacion Alvaro Obregon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/271,829

(22) Filed: Sep. 21, 2016

(51) Int. Cl.
*B60J 5/10* (2006.01)

(52) U.S. Cl.
CPC ..................... *B60J 5/107* (2013.01)

(58) Field of Classification Search
CPC .......................................... B60J 5/10
USPC ....................................... 296/146.8
See application file for complete search history.

(56) References Cited

U.S. PATENT DOCUMENTS

| | | | | |
|---|---|---|---|---|
| 6,854,785 B2* | 2/2005 | Simon | ................... | B60J 5/0416 296/146.7 |
| 7,537,267 B2* | 5/2009 | Tanaka | ................... | B60J 5/0429 296/146.6 |
| 8,403,399 B2 | 3/2013 | Kuntze et al. | | |
| 8,567,841 B2 | 10/2013 | Ginestet et al. | | |
| 9,162,555 B2* | 10/2015 | Kodama | ................... | B60J 5/10 |
| 2003/0110705 A1* | 6/2003 | Hlavach | ................... | B60J 5/107 49/501 |
| 2008/0011188 A1* | 1/2008 | Campus | ............... | B61D 17/045 105/401 |
| 2016/0114663 A1* | 4/2016 | Kawashima | ............. | B60J 5/107 49/501 |
| 2016/0152121 A1* | 6/2016 | Ikeda | ....................... | B60J 5/101 49/501 |
| 2016/0167494 A1 | 6/2016 | Ayukawa | | |

FOREIGN PATENT DOCUMENTS

DE 102014222161 A1 5/2015

* cited by examiner

*Primary Examiner* — Pinel E Romain
(74) *Attorney, Agent, or Firm* — Jason C. Rogers; Brooks Kushman P.C.

(57) ABSTRACT

A liftgate assembly for a vehicle includes an outer panel and an inner panel. The outer panel is adapted for mounting to a rear portion of a vehicle and includes first and second lower corner regions. The inner panel is mounted to the outer panel such that the outer panel and inner panel define an opening for a rear window. The inner panel includes a first reinforcement rib diagonally extending from the first lower corner region to a Z/Y center adjacent the opening and a second reinforcement rib extending from the second lower corner region to the Z/Y center. The reinforcement ribs are arranged with the outer panel to define an A-shape or inverted V-shape.

17 Claims, 4 Drawing Sheets

LIFTGATE ASSEMBLY FOR A VEHICLE

TECHNICAL FIELD

This disclosure relates to structural reinforcement for portions of a liftgate assembly for a vehicle body.

BACKGROUND

A central portion of an inner panel of a vehicle liftgate assembly provides additional stiffness to the liftgate assembly. Inner panel reinforcement ribs may be oriented in a V-shape relative to one another; however, this V-shape may present assembly challenges and may lack sufficient stiffness.

This disclosure is directed to solving the above problems and other problems as summarized below.

SUMMARY

According to an aspect of the present disclosure, a liftgate assembly for a vehicle includes an outer panel and an inner panel. The outer panel is adapted for mounting to a rear portion of a vehicle and includes first and second lower corner regions. The inner panel is mounted to the outer panel such that the outer panel and inner panel define an opening for a rear window. The inner panel includes a first reinforcement rib diagonally extending from the first lower corner region to a Z/Y center adjacent the opening and a second reinforcement rib extending from the second lower corner region to the Z/Y center. The reinforcement ribs are arranged with the outer panel to define an A-shape. A lower horizontal reinforcement rib may extend between the first lower corner region and the second lower corner region. A vertical reinforcement rib may extend from the lower horizontal reinforcement rib at a location adjacent a latch support to the Z/Y center. The lower horizontal reinforcement rib may be located adjacent a bumper when the liftgate assembly is in a closed position. The Z/Y center may further be defined as a location adjacent a support surface formed on the inner panel sized to receive at least a portion of a wiper assembly. The Z/Y center may further be defined by an intersection of a vertical axis spanning between an upper edge and a lower edge of the outer panel and a horizontal axis spanning between a first outer edge and a second outer edge of the outer panel. Each of the lower corner regions may be located adjacent a rear pillar of the vehicle when the outer panel is in a closed position.

According to another aspect of the present disclosure, a liftgate assembly for a vehicle includes an outer panel and an inner panel. The outer panel defines a window opening. The inner panel is adapted for securing to the outer panel at a location below the window opening and includes a first reinforcement rib and a second reinforcement rib. The reinforcement ribs are arranged with one another to define an A-shape relative to an underlying surface. An apex of the A-shape may be located at a Z/Y center region adjacent a lower edge of the window opening. The inner panel may further include a lower horizontal reinforcement rib spanning between a lower portion of the first reinforcement rib and a lower portion of the second reinforcement rib, and adjacent a lower edge of the outer panel. The inner panel may further include a vertical reinforcement rib extending from an apex of the A-shape to a central portion of the lower horizontal reinforcement rib. The inner panel may further include a vertical reinforcement rib extending from a Z/Y center region to a location adjacent a latch support of the liftgate assembly. The first reinforcement rib may extend from a first location adjacent a first lower corner portion of the outer panel to a Z/Y center region. The second reinforcement rib may extend from a second location adjacent a second corner portion of the outer panel to the Z/Y center region. An upper horizontal reinforcement rib may span along a lower edge of the window opening and through a Z/Y center of the inner panel.

According to another aspect of the present disclosure, an inner panel for a vehicle liftgate assembly includes a first diagonal reinforcement rib, a second diagonal reinforcement rib, and a lower horizontal reinforcement rib. The reinforcement ribs are arranged with one another to define a triangular shape having an apex located adjacent a Z/Y center of a rear liftgate outer panel adapted for the inner panel to mount thereto. The first diagonal reinforcement rib may extend diagonally from a location adjacent a first lower corner portion of the rear liftgate outer panel to the Z/Y center. The second diagonal reinforcement rib may extend diagonally from a location adjacent a second corner portion of the rear liftgate outer panel to the Z/Y center. The first diagonal reinforcement rib and the second diagonal reinforcement rib may be arranged with one another to define an inverted V-shape. The inner panel may further include a vertical reinforcement rib extending from a central portion of the lower horizontal rib to the Z/Y center. The reinforcement ribs may be arranged with one another to define one or more inner panel openings between the reinforcement ribs. The first diagonal reinforcement rib may include a lower portion located adjacent a D-pillar of a vehicle body when the inner panel is mounted to the rear liftgate outer panel in a closed position. An upper horizontal reinforcement rib may span along a lower edge of a window opening defined by the rear liftgate outer panel.

DETAILED DESCRIPTION

The disclosed embodiments of the present disclosure are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
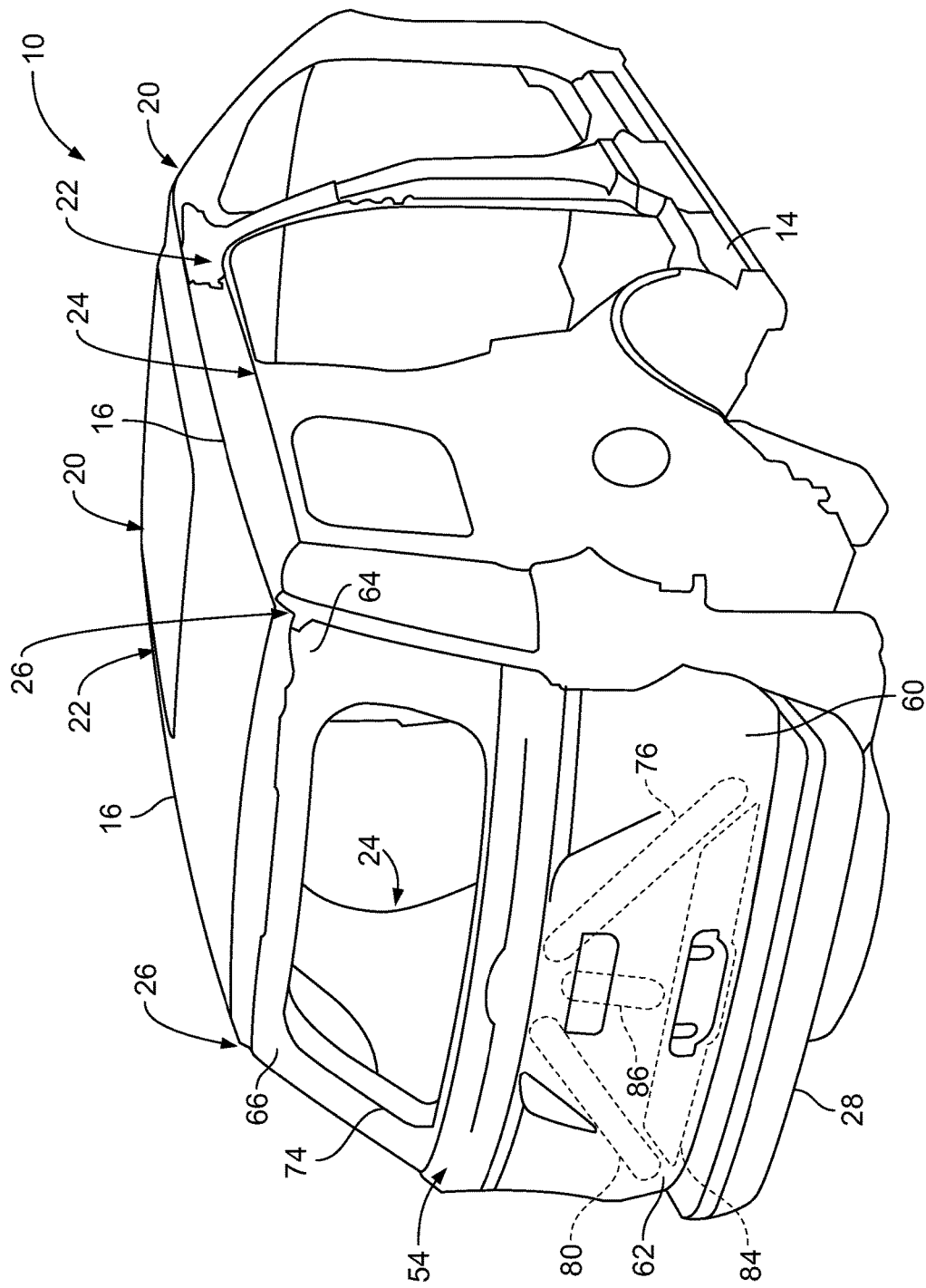
FIG. 1 is a perspective view of an example of a vehicle body including a liftgate.

FIG. 1 illustrates an example of a vehicle body, referred to generally as a vehicle body 10 herein. The vehicle body 10 includes rocker panels 14 spaced from roof rails 16. Pillars extend between the rocker panels 14 and the roof rails 16. For example, the vehicle body 10 may include A-pillars 20, B-pillars 22, C-pillars 24, and D-pillars 26. The A-pillars 20 are spaced from one another and partially define an opening for a front windshield. The A-pillars 20, the B-pillars 22, the rocker panels 14, and the roof rails 16 define an opening for a front door. The B-pillars 22, the C-pillars 24, the rocker panels 14, and the roof rails 16 define an opening for a rear door. A bumper 28 is mounted to the vehicle body 10. The D-pillars 26 are spaced from one another to partially define an opening for a rear liftgate.

Figure 2:
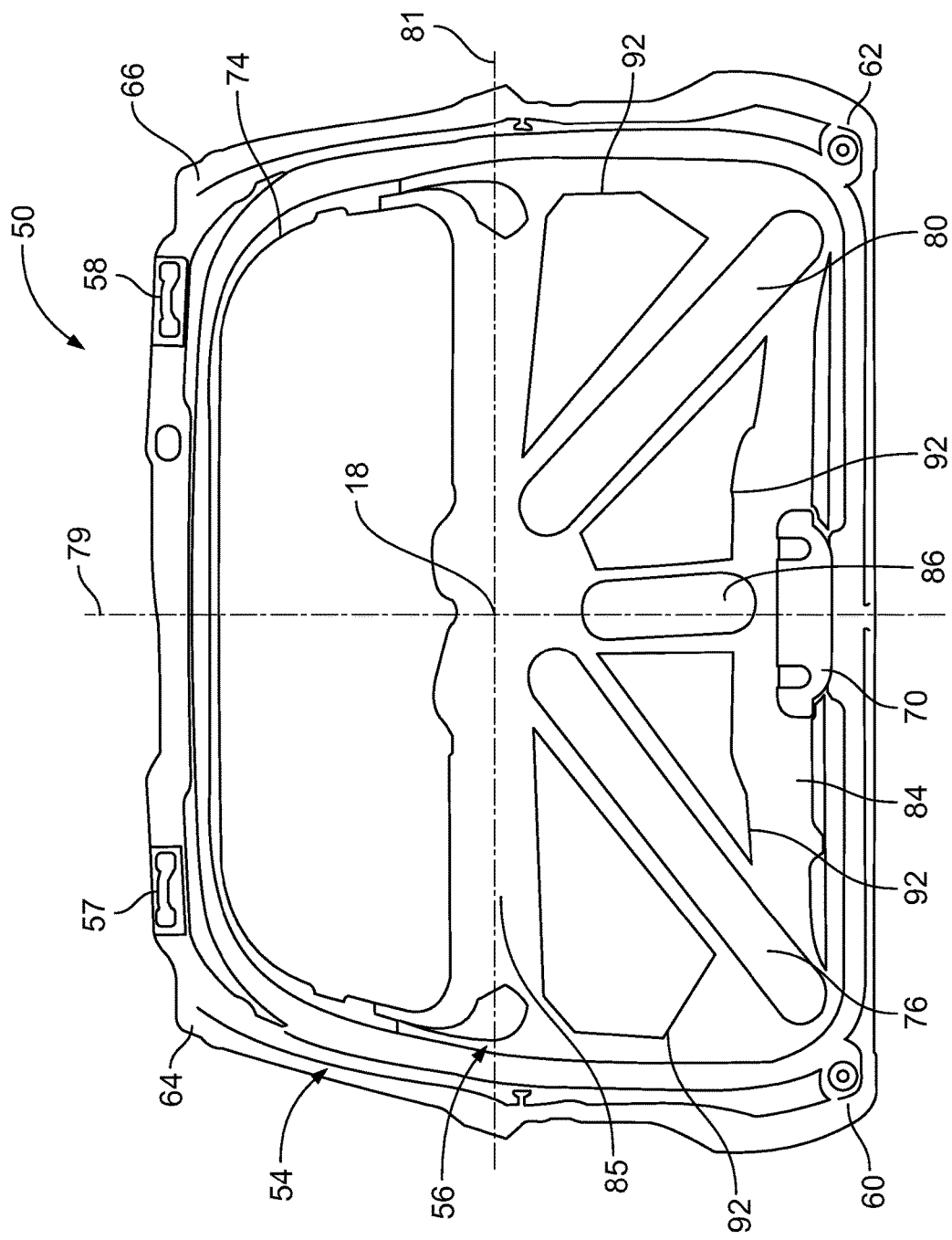
FIG. 2 is a rear view of an example of a liftgate assembly for a vehicle.
Figure 3:
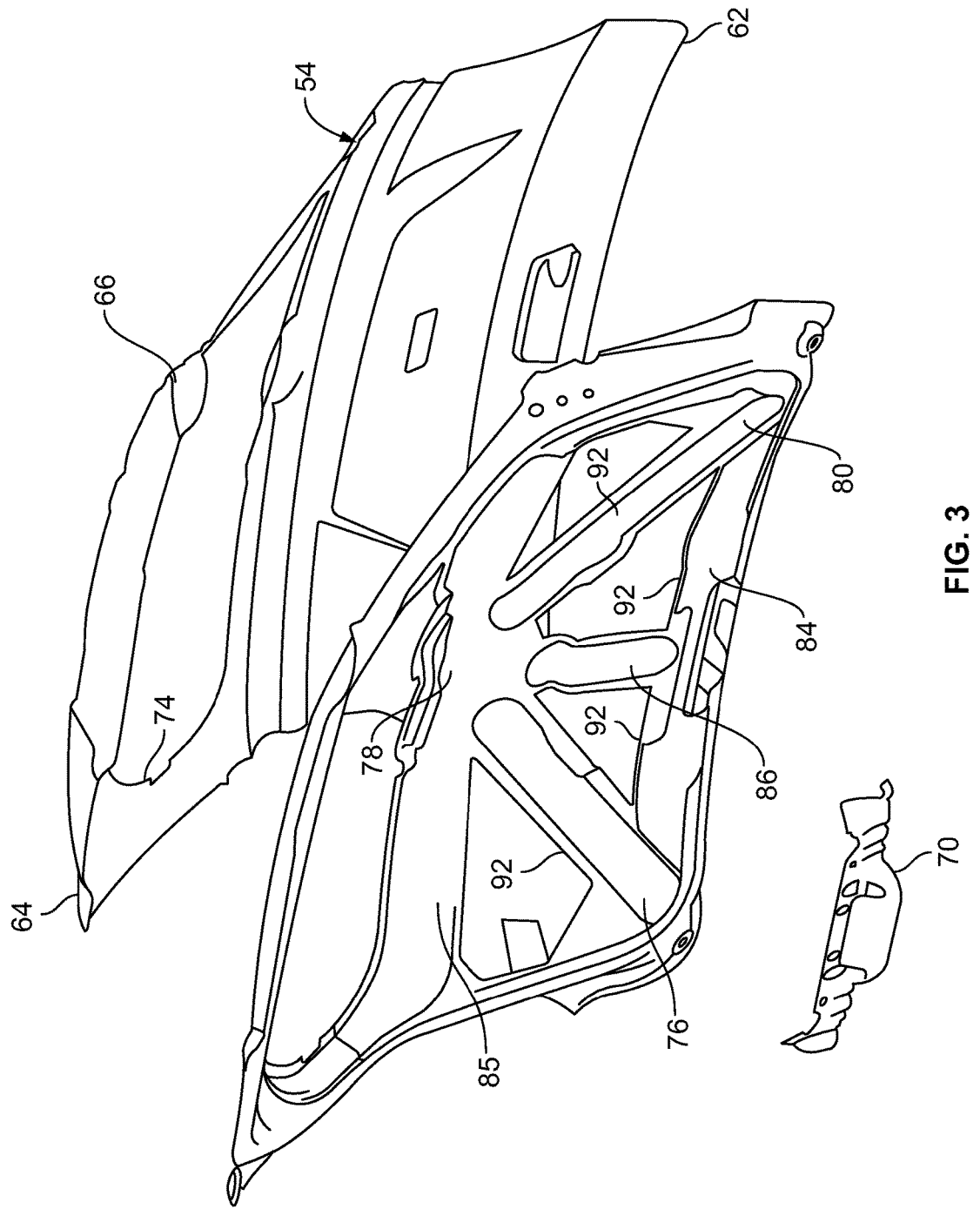
FIG. 3 is an exploded view of the liftgate assembly of FIG. 2.

For example, FIGS. 2 and 3 show an example of a rear liftgate assembly, referred to generally as a rear liftgate assembly 50 herein. The rear liftgate assembly 50 is mounted to the vehicle body 10 for rotation between at least a closed position and an open position. The rear liftgate assembly 50 includes an outer panel 54 and an inner panel 56. The outer panel 54 includes a first hinge region 57 and a second hinge region 58 each disposed at an upper portion of the outer panel 54. The first hinge region 57 and the second hinge region 58 are each sized to receive a hinge to pivotally mount the rear liftgate assembly 50 to the vehicle body 10.

The outer panel 54 further includes a first lower corner 60, a second lower corner 62, a first upper corner 64, and a second upper corner 66. Each of the corners is located adjacent a respective D-pillar 26 of the vehicle body 10 when the liftgate assembly 50 is in the closed position. A latch support 70 is disposed between the first lower corner 60 and the second lower corner 62. The latch support 70 is adapted to selectively engage and disengage a striker (not shown) disposed on the vehicle body 10. The outer panel 54 defines an opening 74 sized to receive a window.

The inner panel 56 may be adapted for securing to the outer panel 54 as shown in FIG. 2. The inner panel 56 includes structural reinforcement ribs arranged with one another to define an A-shape or triangle shape. For example, a first reinforcement rib 76 extends diagonally from a location adjacent the first lower corner 60 to a Z/Y center 78. The Z/Y center 78 is a region of the inner panel 56 located at region spaced substantially equidistant from an upper edge and lower edge of the outer panel 54 and a first outer edge and a second outer edge of the outer panel 54. For example, the Z/Y center may be at a region defined by an intersection of a vertical axis 79 spanning between the upper edge and the lower edge of the outer panel 54 and a horizontal axis 81 spanning between the first outer edge and the second outer edge of the outer panel 54. As another example, the Z/Y center 78 may be located adjacent a support surface formed in the inner panel 56 sized to receive at least a portion of a wiper assembly (not shown).

A second reinforcement rib 80 extends diagonally from a location adjacent the second lower corner 62 to the Z/Y center 78 such that an apex of the A-shape is located at the Z/Y center 78. The first reinforcement rib 76 and the second reinforcement rib 80 are arranged with one another to define substantially an A-shape or an inverted V-shape relative to an underlying surface.

The inner panel 56 further includes a lower horizontal reinforcement rib 84, an upper horizontal reinforcement rib 85, and a vertical reinforcement rib 86. The lower horizontal reinforcement rib 84 extends between a lower portion of the first reinforcement rib 76 and a lower portion of the second reinforcement rib 80 such that the first reinforcement rib 76, the second reinforcement rib 80, and the lower horizontal reinforcement rib 84 define a triangular shape. The lower horizontal reinforcement rib 84 is located adjacent a bumper (not shown in FIG. 2) when the liftgate assembly 50 is in the closed position. The upper horizontal reinforcement rib 85 extends along a lower edge of the opening 74 and through the Z/Y center 78. Each of the lower portions of the first reinforcement rib 76 and the second reinforcement rib 80 are located adjacent respective lower corners of the outer panel 54.

The vertical reinforcement rib 86 extends from the Z/Y center 78 at the upper horizontal reinforcement rib 85 to the lower horizontal reinforcement rib 84. For example, one end of the vertical reinforcement rib 86 may be located adjacent latch support 70. The reinforcement ribs are arranged with one another to define one or more openings 92. This arrangement and the one or more openings 92 provide a reduced weight of the inner panel 56 in comparison to a continuous inner panel without openings.

Figure 4:
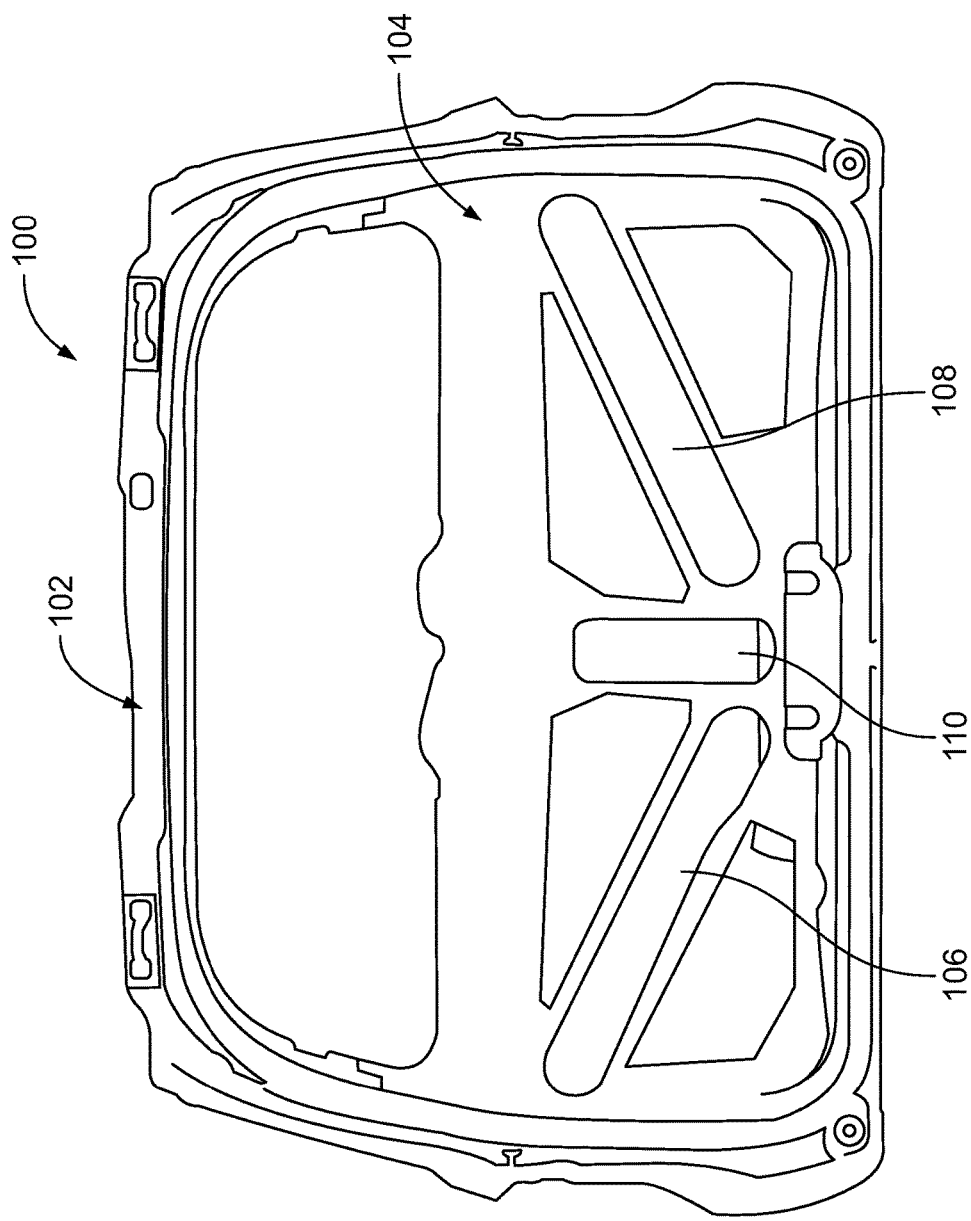
FIG. 4 is an example of a prior art liftgate assembly for a vehicle.

FIG. 4 illustrates an example of a previous liftgate assembly, referred to generally as a liftgate assembly 100. The liftgate assembly 100 includes reinforcements arranged to define a V-shape which does not provide as much structural reinforcement in comparison to the A-shape of the liftgate assembly 50. For example, the liftgate assembly 100 includes an outer panel 102 and an inner panel 104. The inner panel 104 includes a first V reinforcement rib 106, a second V reinforcement rib 108, and a third V reinforcement rib 110. In this example, the first V reinforcement rib 106 and the second V reinforcement rib 108 are arranged with one another to define a V-shape relative to an underlying surface. As shown in FIG. 4, the liftgate assembly 100 does not include reinforcement ribs extending to lower corner portions of the outer panel 102 and does not include reinforcement ribs meeting at an apex adjacent a Z/Y center of the outer panel 102. As a result, a portion of the liftgate assembly 100 is weaker at the Z/Y center and at the lower corner portions in comparison to the rear liftgate assembly 50.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A liftgate assembly for a vehicle comprising:
   an outer panel adapted for mounting to a rear portion of a vehicle and including first and second lower corner regions;
   an inner panel mounted to the outer panel such that the outer panel and inner panel define an opening for a rear window and including a first reinforcement rib diagonally extending from the first lower corner region to a Z/Y center adjacent the opening and a second reinforcement rib extending from the second lower corner region to the Z/Y center; and a lower horizontal reinforcement rib extending between the first lower corner region and the second lower corner region, wherein the reinforcement ribs are arranged with the outer panel to define an A-shape.

2. The liftgate assembly of claim 1 further comprising a vertical reinforcement rib extending from the lower horizontal reinforcement rib at a location adjacent a latch support to the Z/Y center.

3. The liftgate assembly of claim 2, wherein the lower horizontal reinforcement rib is located adjacent a bumper when the liftgate assembly is in a closed position.

4. The liftgate assembly of claim 1, wherein the Z/Y center is further defined as a location adjacent a support surface formed on the inner panel sized to receive at least a portion of a wiper assembly.

5. The liftgate assembly of claim 1, wherein the Z/Y center is further defined by an intersection of a vertical axis spanning between an upper edge and a lower edge of the outer panel and a horizontal axis spanning between a first outer edge and a second outer edge of the outer panel.

6. The liftgate assembly of claim 1, wherein each of the lower corner regions is located adjacent a rear pillar of the vehicle when the outer panel is in a closed position.

7. A vehicle liftgate assembly comprising:
an outer panel defining a window opening; and
an inner panel adapted for securing to the outer panel at a location below the window opening and including a first reinforcement rib and a second reinforcement rib, wherein the reinforcement ribs are arranged with one another to define an A-shape having an apex located at a Z/Y center region adjacent a lower edge of the window opening.

8. The liftgate assembly of claim 7, wherein the inner panel further comprises a lower horizontal reinforcement rib spanning between a lower portion of the first reinforcement rib and a lower portion of the second reinforcement rib, and adjacent a lower edge of the outer panel.

9. The liftgate assembly of claim 8, wherein the inner panel further comprises a vertical reinforcement rib extending from the apex of the A-shape to a central portion of the lower horizontal reinforcement rib.

10. The liftgate assembly of claim 7, wherein the inner panel further comprises a vertical reinforcement rib extending from a Z/Y center region to a location adjacent a latch support of the liftgate assembly.

11. The liftgate assembly of claim 7, wherein the first reinforcement rib extends from a first location adjacent a first lower corner portion of the outer panel to a Z/Y center region, and wherein the second reinforcement rib extends from a second location adjacent a second corner portion of the outer panel to the Z/Y center region.

12. The liftgate assembly of claim 7 further comprising an upper horizontal reinforcement rib spanning along a lower edge of the window opening and through a Z/Y center of the inner panel.

13. An inner panel for a vehicle liftgate assembly comprising:
a first diagonal reinforcement rib;
a second diagonal reinforcement rib; and
a lower horizontal reinforcement rib;
a vertical reinforcement rib extending from a central portion of the lower horizontal reinforcement rib to a Z/Y center,
wherein the reinforcement ribs are arranged with one another to define a triangular shape having an apex located adjacent the Z/Y center of a rear liftgate outer panel adapted for the inner panel to mount thereto.

14. The inner panel of claim 13, wherein the first diagonal reinforcement rib extends diagonally from a location adjacent a first lower corner portion of the rear liftgate outer panel to the Z/Y center, wherein the second diagonal reinforcement rib extends diagonally from a location adjacent a second corner portion of the rear liftgate outer panel to the Z/Y center, and wherein the first diagonal reinforcement rib and the second diagonal reinforcement rib are arranged with one another to define an inverted V-shape.

15. The inner panel of claim 13, wherein the reinforcement ribs are arranged with one another to define one or more inner panel openings between the reinforcement ribs.

16. The inner panel of claim 13, wherein the first diagonal reinforcement rib includes a lower portion located adjacent a D-pillar of a vehicle body when the inner panel is mounted to the rear liftgate outer panel in a closed position.

17. The inner panel of claim 13 further comprising an upper horizontal reinforcement rib spanning along a lower edge of a window opening defined by the rear liftgate outer panel.

* * * * *